Patented Apr. 8, 1924.

1,489,315

UNITED STATES PATENT OFFICE.

JOHN M. DONOHUE, OF ROCHESTER, NEW YORK, ASSIGNOR TO EASTMAN KODAK COMPANY, OF ROCHESTER, NEW YORK, A CORPORATION OF NEW YORK.

PROCESS OF MAKING CELLULOSE ETHER.

No Drawing. Application filed April 1, 1921, Serial No. 457,723. Renewed October 4, 1923.

*To all whom it may concern:*

Be it known that I, JOHN M. DONOHUE, a citizen of the United States of America, residing at Rochester, in the county of Monroe and State of New York, have invented certain new and useful Improvements in Processes of Making Cellulose Ethers, of which the following is a full, clear, and exact specification.

This invention relates to the manufacture of cellulose ethers. One object of the invention is to provide a process by which ethers can be obtained that yield clear transparent films substantially free from haziness. Other objects will hereinafter appear.

In the manufacture of cellulose ethers, it has been proposed to react upon a mixture of cellulose and alkali with an etherifying agent, a small amount of water being sometimes present. The reaction may be carried on in an autoclave in which the ingredients are simultaneously heated and agitated.

I have found that ethers are formed which produce hazy films without sufficient transparency unless the walls of the autoclave in contact with the ingredients be composed of certain materials. My investigations indicate that the haze is probably not due to metallic salts formed by the reaction of ingredients with the lining of the autoclave, but that certain metals have a specific beneficial action which improves the product. I prefer to carry on the reaction in the presence of surfaces of nickel or alloys which contain large percentages of nickel, such as Monel metal.

By way of example, I may take a very intimate mixture of cotton 100 parts, water 250 parts, caustic soda 200 parts, and react on it with 400 parts of ethyl chloride in the presence of nickel or Monel metal retaining walls for twenty-four hours at a temperature ranging between 90 and 170° C.

Having thus described my invention, what I claim as new and desire to secure by Letters Patent is:

1. The process of making cellulose ethers, which comprises the step of reacting on a mixture containing cellulose and alkali with an etherifying agent in the presence of a surface of nickeliferous metal.

2. The process of making alkyl ethers of cellulose, which comprises the step of reacting on a mixture containing cellulose and an alkali metal hydroxid with an alkylating agent when confined in a surface of nickeliferous metal.

3. The process of making ethyl ethers of cellulose, which comprises the step of heating and agitating cellulose, caustic soda, water and ethyl chloride when confined in and contacting with walls of nickeliferous metal.

Signed at Rochester, New York, this 26th day of March 1921.

JOHN M. DONOHUE.